United States Patent
Gallo et al.

(10) Patent No.: US 8,395,488 B2
(45) Date of Patent: Mar. 12, 2013

(54) METHOD FOR STORING DATA AS WELL AS A TRANSPONDER, A READ/WRITE-DEVICE, A COMPUTER READABLE MEDIUM INCLUDING A PROGRAM ELEMENT AND SUCH A PROGRAM ELEMENT ADAPTED TO PERFORM THIS METHOD

(75) Inventors: Francesco Gallo, Hamburg (DE); Hauke Meyn, Krempermoor (DE)

(73) Assignee: NXP B.V., Eindhoven (NL)

( * ) Notice: Subject to any disclaimer, the term of this patent is extended or adjusted under 35 U.S.C. 154(b) by 540 days.

(21) Appl. No.: 12/519,734
(22) PCT Filed: Dec. 11, 2007
(86) PCT No.: PCT/IB2007/055020
§ 371 (c)(1),
(2), (4) Date: Jun. 17, 2009
(87) PCT Pub. No.: WO2008/078216
PCT Pub. Date: Jul. 3, 2008

(65) Prior Publication Data
US 2010/0090810 A1 Apr. 15, 2010

(30) Foreign Application Priority Data
Dec. 22, 2006 (EP) .................................. 06026736

(51) Int. Cl.
*H04Q 5/22* (2006.01)
*G08B 13/14* (2006.01)
*G08B 5/36* (2006.01)
*G05B 19/00* (2006.01)
*G06K 19/06* (2006.01)

(52) U.S. Cl. .................. 340/10.51; 340/10.1; 340/10.3; 340/572.1; 340/5.65; 340/815.54; 340/10.52; 235/492

(58) Field of Classification Search .... 340/572.1–572.9, 340/10.1, 10.3, 505, 10.51, 10.52, 5.65, 825.54, 340/825.34, 575, 10.33; 455/41.2, 41, 73, 455/76, 77, 78, 82, 83, 38.3, 343; 711/117–118, 711/141, 146, 137, 213, 217, 170, 155, 156, 711/100, 171; 709/209, 224
See application file for complete search history.

(56) References Cited

U.S. PATENT DOCUMENTS
6,101,477 A     8/2000  Hohle
2004/0015969 A1* 1/2004  Chang ........................... 718/100
(Continued)

FOREIGN PATENT DOCUMENTS
GB       2 333 630 A       7/1999
WO       03/042799 A2      5/2003

OTHER PUBLICATIONS

NFC Forum: "Type 2 Tag Operation—Technical Specification"; Internet Article; Jul. 9, 2007; http://www.nfc.forum.org/specs/spec_license/download_spec/85a9d762b0020071c719cb9b2c5a5b94b3141dda/nfcforum-ts-ty-type-2_tag...1.0.pdf; Retreived May 9, 2008. p. 1-44.

(Continued)

*Primary Examiner* — Jennifer Mehmood
*Assistant Examiner* — Mirza Alam

(57) ABSTRACT

A method for storing or reading data in a memory array of a transponder and a corresponding transponder, read/write device and program element is described. Therein, a data structure for storing data within the memory array is defined by a predetermined protocol. The data structure comprises: a header data block including predefined header data; an application data block for storing application data; and a terminator data block for indicating that, in accordance with the predetermined protocol, no data are stored within the memory array behind the terminator data block. The method for storing data comprises storing additional application data within the memory array behind the terminator data block. Thereby, memory areas which, according to the predetermined protocol, are not used can be used for new applications, data can be hidden in these areas such that they can not be read by protocol compliant reader devices and the data structure read or written by the method of the invention is compatible with the former predetermined protocol.

20 Claims, 3 Drawing Sheets

U.S. PATENT DOCUMENTS

| | | |
|---|---|---|
| 2005/0077356 A1* | 4/2005 | Takayama et al. ............ 235/451 |
| 2005/0127180 A1* | 6/2005 | Matsumoto et al. .......... 235/451 |
| 2006/0016870 A1 | 1/2006 | Bonalle et al. |
| 2006/0129806 A1* | 6/2006 | Walmsley ..................... 713/161 |
| 2006/0163365 A1* | 7/2006 | Nakabe ......................... 235/492 |
| 2006/0229113 A1* | 10/2006 | Rowse ........................... 455/574 |
| 2007/0001853 A1* | 1/2007 | Otranen .................... 340/572.1 |
| 2007/0125836 A1* | 6/2007 | McAllister et al. ........... 235/375 |
| 2008/0065877 A1* | 3/2008 | Son et al. ....................... 713/151 |

OTHER PUBLICATIONS

Ferrari, Jorge, et al; "Smart Cards: A Case Study"; Internet Article; Oct. 1998; XP002481135; http://www.redbooks.ibm.com/redbooks.pdfs/sq245239.pdf; Retreived May 21, 2008; p. 1-202.

* cited by examiner

| Byte Number | 0 | 1 | 2 | 3 | Block |
|---|---|---|---|---|---|
| UID / Internal | UID0 | UID1 | UID2 | Internal0 | 0 |
| Serial Number | UID3 | UID4 | UID5 | UID6 | 1 |
| Internal / Lock | Internal1 | Internal2 | Lock0 | Lock1 | 2 |
| CC | CC0 | CC1 | CC2 | CC3 | 3 |
| Data | Data0 | Data1 | Data2 | Data3 | 4 |
| Data | Data4 | Data5 | Data6 | Data7 | 5 |
| Data | Data8 | Data9 | Data10 | Data11 | 6 |
| Data | .. | .. | .. | .. | . |
| Data | .. | .. | .. | .. | . |
| Data | .. | .. | .. | .. | . |
| Data | .. | .. | .. | .. | . |
| Data | .. | .. | .. | .. | n |
| Lock / Reserved | .. | .. | .. | .. | . |
| Lock / Reserved | .. | .. | .. | .. | . |
| Lock / Reserved | .. | .. | .. | .. | k |

Fig 1

METHOD FOR STORING DATA AS WELL AS A TRANSPONDER, A READ/WRITE-DEVICE, A COMPUTER READABLE MEDIUM INCLUDING A PROGRAM ELEMENT AND SUCH A PROGRAM ELEMENT ADAPTED TO PERFORM THIS METHOD

FIELD OF INVENTION

The present invention relates to the field of storing and reading data in a transponder wherein data can be stored in accordance with a storage protocol. Particularly, the present invention relates to storing and reading additional data in a transponder such as an all contactless memory card or a RFID (Radio Frequency IDentification) tag in which data can be stored in accordance with the Type 2 Tag Operation standardization of the NFC Forum.

ART BACKGROUND

Identification products such as smart cards and RFID tags are used widely in fields such as transport (ticketing, road tolling, baggage tagging), finance (debit and credit cards, electronic purse, merchant card), communications (SIM card for GSM phone), and tracking (access control, inventory management, asset tracking) Radio Frequency IDentification (RFID) is an automatic identification method, relying on storing and remotely retrieving data using devices called RFID tags or transponders. An RFID tag is an object that e.g. can be attached to or incorporated into a product, animal, or person e.g. for the purpose of identification using radio waves. Chip-based RFID tags contain e.g. silicon chips and antennas. Passive tags require no internal power source, whereas active tags require a power source.

International standard ISO14443A is a industry standard for contactless smart cards. ISO14443A-compliant products provide RF communication technology for transmitting data between a card or tag and a reader device. For example, in electronic ticketing for public transport, travelers just wave their card over a reader at the turnstiles or entry point, benefiting from improved convenience and speed in the ticketing process. Such products are set to be the key to individual mobility in the future, supporting multiple applications including road tolling, airline tickets, access control and many more.

Evolving from a combination of contactless identification and networking technologies, Near Field Communication (NFC) (see for example the standard ISO 18092) is a very short-range wireless technology, for distances measured in centimeters, and is optimised for intuitive, easy and secure communications between various devices without user configuration. In order to make two devices communicate, users bring them close together or even make them touch. The devices' NFC interfaces will automatically connect and configure themselves to form a peer-to-peer network. NFC can also bootstrap other protocols like Bluetooth™ or Wireless Ethernet (WiFi) by exchanging the configuration and session data. NFC is compatible with contactless smart card platforms. This enables NFC devices to read information from these cards, making contactless smart cards the ideal solution for bringing information and vouchers into the NFC world. NFC devices can also operate like a contactless card making them compatible with the huge installed infrastructure of ISO14443A-compliant systems. This functionality is called card emulation. Secure NFC combines NFC applications with smart card security. Devices with secure NFC act like a contactless smart card with cryptographic capabilities. This means that confidential data, and data that represents values, is stored in a secure memory area and always stays on the card. Authentication is performed by the NFC device itself and transmitted data can be encrypted by the NFC device using a private encryption key stored in the device's secure memory.

The Near Field Communication (NFC) Forum is a non-profit industry association founded by Nokia Corporation, Royal Philips Electronics and Sony Corporation to advance the use of NFC short-range wireless interaction in consumer electronics, mobile devices and PCs. The NFC Forum will promote implementation and standardization of NFC technology to ensure interoperability between devices and services.

To store NFC Forum defined data (called NDEF) e.g. inside contactless cards or RFID tags four different draft specifications have been made called: "Type 1 Tag Operational", "Type 2 Tag Operational", "Type 3 Tag Operational" and "Type 4 Tag Operational". This invention is related inter alia to all contactless cards or RFID tags that are compliant to the "Type 2 Tag Operational" specification draft of the NFC Forum (available e.g. from www.nfc-forum.org).

The "Type 2 Tag Operational" draft specification shows how to store data inside transponders used as NFC devices such as e.g. contactless cards and RFIDs.

There may be a need for an alternative way of storing and reading data in transponders such as contactless cards or RFID tags. Especially, there may be a need for a way of storing additional data in transponders such that the additional data is not accessible using a reader device which is compliant with a standardization protocol such as the "Type 2 Tag Operational" draft specification and such that it does not interfere with data stored in compliance with the standardization protocol. Furthermore, there may be a need for corresponding transponder devices, read/write devices, computer program devices and computer readable media for implementing such storing/reading method.

SUMMARY OF THE INVENTION

This need may be met by the subject matter according to the independent claims. Advantageous embodiments of the present invention are described in the dependent claims.

According to a first aspect of the invention there is provided a method for storing data in a memory array of a transponder. A data structure for storing data within the memory array is defined by a predetermined protocol. The data structure comprises: a header data block including predefined header data; an application data block for storing application data; and a terminator data block for indicating that, in accordance with the predetermined protocol, no data are stored within the memory array behind the terminator data block. According to the invention the method comprises the step of storing application data within the memory array behind the terminator data block.

This aspect of the invention is based on the idea that transponders have a memory array of predetermined size. In this memory array, data can be stored. A structure of such stored data is predetermined by a given protocol such that data included in the data structure can be read or written by a protocol compliant read/write device being adapted to operate in accordance with the protocol.

The protocol defines that all application data is to be stored within the application data block. This application data block does not need to be continuous but can include separate data blocks having non-used or reserved areas in between. However, according to the protocol, a terminator data block indicates that no further data is stored behind this terminator data block. In other words, a read device which is adapted to operate in accordance with the protocol will read data in the application data block until it reads predetermined data of the terminator data block and then stops reading. On the other side, a write device which is adapted to operate in accordance with the protocol will write data into the application data block and, when the last application data is written, will write a terminator data block after the application data block.

The method of the first aspect uses the data structure in accordance with the predetermined protocol but includes the additional feature that additional application data is also stored in the memory array of the transponder in a memory field behind the terminator data block. In other words, the terminator data block can be read but instead of indicating that no further application data will come behind the memory position of the terminator data block it serves as an indication that starting from this position additional application data can be stored.

Several advantages can be achieved with the invention. Memory space which according to the protocol is not used can be used for storing additional application data. As a protocol compliant reader device would not access the memory behind the terminator data block these additional data can be hidden from access of such conventional reader device. At the same time, the data conventionally stored within the application data block in accordance with the protocol will not interfere with the additional application data. This provides backwards compatibility.

In the following further details, definitions, features and characteristics about the method of the first aspect are given.

A transponder can be an active element, i.e. having a power source, or a passive element, i.e. without power source, being adapted for near field communication. For example, a transponder can be a RFID tag or a contactless card. Alternatively, the transponder can be an active device which emulates e.g. a tag. For example, the transponder can be included in a mobile phone having a battery wherein the transponder emulates the functions of an RFID tag such that a user can use his mobile phone like an RFID tag. The transponder can include a circuitry establishing an array of volatile or rewritable memory of predetermined size such as for example 64 Bytes or more.

A protocol can be used as a standard or specification defining how data are to be stored in the memory in terms of order and content. For example, the protocol can define which information is to be stored at a specific position within the memory. Furthermore, the protocol can specify indicators or flags. A protocol specifically adapted for transponders is the "Type 2 Tag Operation specification" of the NFC Forum. It specifies, with a set of rules and guidelines, the operation of the NFC Forum Type 2 Tag which can be a tag, card or token compatible with the NFC Forum Type 2 specification and including a contactless IC chip, which has build-in memory and memory access functions. This protocol also defines how data defined according to the NFC Data Exchange Format (NDEF) is detected, read from, and written to the Type 2 Tag in order to achieve and maintain interchangeability and interoperability at the NFC Forum Type 2 Tag read/write level.

The data structure within the memory array of the transponders can include several data blocks.

The header data block can include predefined header data including e.g. a unique identification code, a manufacturer code and static lock bytes representing a field-programmable read-only locking mechanism.

Application data to be stored in the application data block can include any kind of data. For example, data specific to an application to be run in the transponder or in a coupled read/write device can be stored. Alternatively, user specific data including e.g. authentification information can be stored. If the Type 2 Tag Operation specification of the NFC Forum is used as the protocol, the application data can include the NDEF message as specified in this protocol.

The terminator data block mainly provides the information that the application data block which does not necessarily have a predetermined size ends at this position. Basically, it can be provided as a single byte the content of which serves as a flag.

The additional application data to be stored behind the terminator data block in accordance with the present invention can include any kind of data. It is not limited to a specific data format. E.g. it can avoid to use the overhead required by "Type 2 Tag Operational" specification draft and NFC Data Exchange Format (NDEF) as will be understood from the description further below.

According to an embodiment the method further comprises the step of storing an indicator for indicating that application data is stored within the memory array behind the terminator data block. The indicator can be stored anywhere within the memory array, e.g. in the header data block, the application data block or the terminator data block. The indicator can simply indicate that additional data is stored somewhere behind the terminator data block and a reader device would have to search for the stored additional data autonomously using for example predetermined flags or a look-up table. Alternatively, the indicator can include information as to the position (absolute or relative to the position of the terminator data block), length, type or content of the stored additional application data. Such indicator will simplify and accelerate the search for additionally stored application data.

Alternatively, the indicator can be stored behind the terminator data block. In such case, the data structure up to the terminator data block can remain completely unchanged and only includes features in accordance with the predetermined protocol. A reader device operating in accordance with the protocol does not even get a hint of the existence of additional data being stored behind the terminator data block as it is programmed to stop reading at the position of the terminator data block. Accordingly, the additional data can be effectively hidden. Only a reader device as outlined further below and being prepared to read data behind the terminator data block can read the additional data.

In a second aspect of the invention a method for reading data in a memory array of a transponder is provided wherein a data structure for storing data within the memory array is defined by a predetermined protocol as outlined with respect to the first aspect. The method comprises: searching for an indicator stored in at least one of the configuration data block, the application data block, the terminator data block or behind the terminator data block, wherein the indicator includes data for indicating that additional application data is stored within the memory array behind the terminator data block; and reading additional application data stored within the memory array behind the terminator data block.

In an embodiment in accordance with the above first or second aspect, the indicator comprises at least one of data indicating a storage address, a data field length, a number of data fields and a type of application data stored behind the terminator data block. Then, the method can be performed taking into account at least one of these data. This can simplify and accelerate the finding and processing of additionally stored data.

In a third aspect of the invention a transponder is provided in which data is stored and can be read in accordance with one of the above aspects or embodiments. The transponder can be an RFID tag or a contactless smart card.

In a fourth aspect of the invention a read/write-device is provided which is adapted to perform the method according to one of the above aspects or embodiments. Specifically, the read/write-device can be able the detect a terminator data block or to retrieve information about the position of additionally stored application data from a specific indicator and to read the additionally application data stored behind the terminator data block.

In a fifth aspect of the invention a computer readable medium is provided, the medium including a program element adapted to perform the method according to one of the above aspects or embodiments.

In a sixth aspect of the invention a program element is provided which is adapted to perform the method according to one of the above aspects or embodiments.

On the basis of the above given and the following explanation of the methods for storing or reading data in a transponder a skilled person will we able to translate the steps of the method into a computer program element for carrying out the method.

It has to be noted that embodiments of the invention are described with reference to different subject matters. In particular, some embodiments are described with reference to apparatus type claims whereas other embodiments are described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered to be disclosed with this application.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWINGS

FIG. 1 shows an example of a memory structure of a NFC Forum Type 2 tag.

DETAILED DESCRIPTION OF EMBODIMENTS

Figure 2:
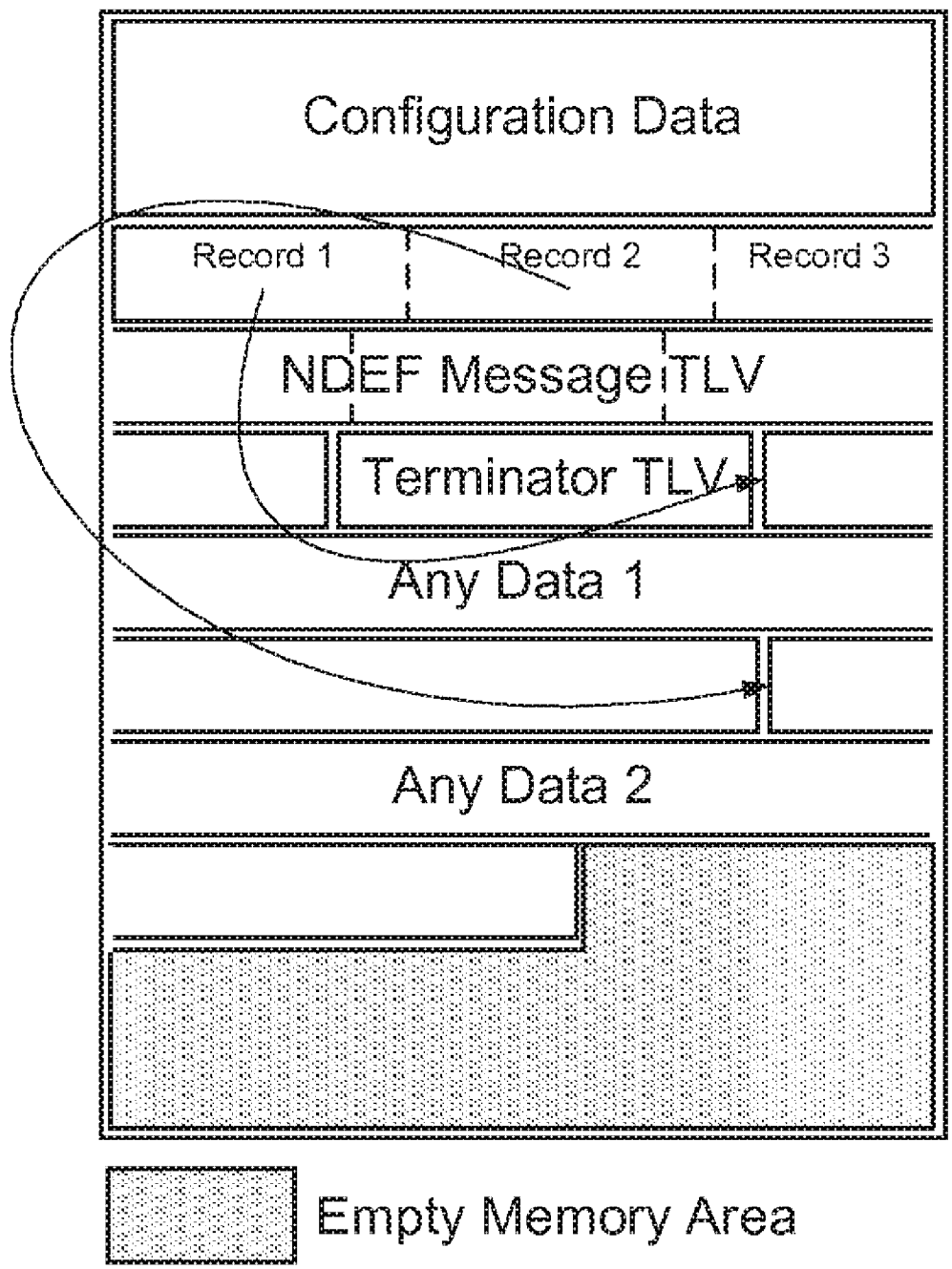
FIG. 2 schematically shows an exemplary data structure which can be read or written according to a an embodiment of the present invention.

In the following, embodiments of the present invention are described wherein the Type 2 Tag Operation specification of the NFC Forum (herein called in the following "type 2 tag protocol") is used as the predetermined protocol. Main features of this protocol are described herein and the terminology used in this protocol will be used in the following description. Further details concerning this protocol can be obtained from the NFC Forum's publications available e.g. via www.nfc-forum.org. A read/write device which is adapted to operate in accordance with the type 2 tag protocol will also be referred as "NFC Forum Device" herein.

The following conventions and notations apply in this document unless otherwise stated:

Binary numbers are represented by strings of digits 0 and 1 shown with the most significant bit (msb) left and the least significant bit (lsb) right, "b" is added at the end.

Example: 11110101b

Hexadecimal numbers are represented is using the numbers 0-9 and the characters A-F, a "h" is added at the end. The Most Significant Byte (MSB) is shown on the left, the Least Significant Byte (LSB) on the right.

Example: F5h

Decimal numbers are represented as is (without any tailing character).

Example: 245

A type 2 tag is based on a particular memory chip with a certain memory size and space for data. The method of the present invention is especially applicable to tags of the type having a dynamic memory structure. This memory structure (or layout) is applied to Type 2 tags with a memory size bigger than 64 bytes. FIG. 1 shows an example of a memory layout of such tag. It is comprises different fields:

UID, Unique identifier
Internal, bytes for manufacturing usage
Reserved, reserved bytes
Lock, static and dynamic lock bytes, to switch the tag from READ/WRITE state to READ-ONLY state
CC, Capability Container bytes
Data, bytes used to store information In FIG. 1 each block is numbered from 0 to k. The block n indicates the last block of the data area of the memory array. Blocks from n+1 to k contain reserved or lock bytes.

In the type 2 tag protocol so called TLV blocks are defined. A TLV block shall consist of one to three fields:

T (tag field, or T field) shall identify the type of the TLV block and shall consist of a single byte encoding a number from 00h to FFh.

L (length field, or L field) shall provide the size in bytes of the value field. It has two different formats composed of one, or three bytes. The NFC Forum Device shall understand all two length field formats.

V (value field, or V field) If the length field is equal to 00h or there is no length field, there shall not be the value field, i.e. the TLV block is empty. If there is the length field and indicates a length of the value field N bigger than zero (N>0), the value field shall consist of N consecutive bytes.

The following table lists the TLV blocks specified by the type 2 tag operation specification:

| TLV block name | Tag Field Value | Short Description |
| --- | --- | --- |
| NULL TLV | 00h | It might be used for padding of memory areas and the NFC Forum Device shall ignore this |
| Lock Control TLV | 01h | It defines details of the lock bits |
| Memory Control TLV | 02h | It identifies reserved memory areas |
| NDEF Message TLV | 03h | It contains an the NDEF message |
| Proprietary TLV | FDh | Tag proprietary information |
| Terminator TLV | FEh | Last TLV block in the data area |

The TLV blocks shall be written in a specific order inside the data area:
NDEF Message TLVs and Proprietary TLVs are present after all Lock Control TLVs and Memory Control TLVs.

the Terminator TLV is the last TLV block on the Type 2 tag platform

The NDEF Message TLV shall be always present inside the Type 2 tag. It stores the NDEF message inside the Value field. The NFC Forum Device shall be able to read/process the first NDEF message found; anyhow further NDEF Message TLV blocks may be present.

The Terminator TLV may be present inside the Type 2 tag, and an NFC Forum Device shall be able to read/process it. According to the type 2 tag operation specification of the NFC forum, the Terminator TLV is the last TLV block in the data memory area. Terminator TLV shall be composed of 1 byte tag field. Below the encoding of the tag field of the Terminator TLV are shown:

T SHALL be equal to FEh.
L SHALL NOT be present.
V SHALL NOT be present.

FIG. 2 shows a data structure which can be written in accordance with an embodiment of the invention. In a header data block, configuration data including e.g. a tag unified identifier, lock bytes and manufacturer bytes are stored. After the header data block, an application data block is located. Therein, application or user data can be stored in the form of one or more NDEF message TLVs. Behind the application data block, a terminator data block is located. It includes a Terminator TLV indicating to a NFC Forum Device the last byte of valid data in the application data block.

According to the type 2 tag protocol, the memory area after the Terminator TLV is not used and a NFC Forum device is adapted to stop any read/write operation at the location of the Terminator TLV. This non-used memory area behind the Terminator TLV is exploited by this embodiment of the invention to store additional data (called in the picture Any Data 1 and Any Data 2).

The indication of the existence of the additional data may be contained inside any NDEF Message TLV or Proprietary TLV stored before the Terminator TLV, and indicated by the unique identifier of the tag and any information related to the tag itself and not to the data stored in it.

In the example of FIG. 2 the indication of the existence of Any Data 1 and 2 is stored inside the records of the NDEF message inside the NDEF Message TLV. The additional data may be located anywhere inside the memory area after the Terminator TLV, and may be split into different non-contiguous chunks. If needed the indication of the existence of the additional information may contain the position and/or size of these chunks.

Figure 3:
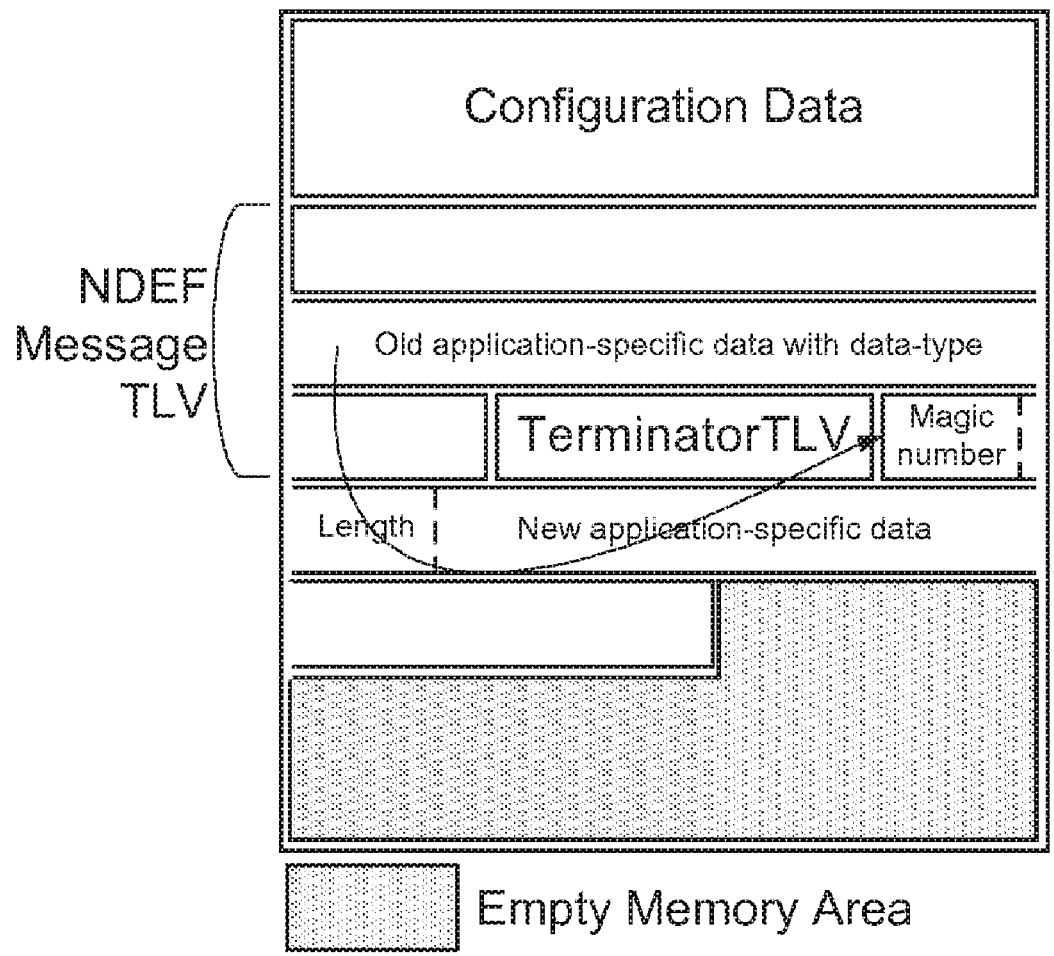
FIG. 3 schematically shows another exemplary data structure which can be read or written according to a another embodiment of the present invention.

FIG. 3 shows a data structure which can be written in accordance with another embodiment of the invention. An old-application is an application that stores inside the NDEF Message of the NDEF Message TLV application-specific data. A new-application for backward compatible reasons cannot modify the NDEF Message adding new application-specific data related to possible new features. However using the present invention the new-application can store the additional new application-specific data after the terminator TLV.

This new data is identified with two operations done by the new-application in the reader device:
the new-application looks inside the NDEF Message for the data-type and data of the old-application, and
the new-application looks for a specific magic number (e.g. 1, 2, 4 ... bytes magic number) in the memory area after the Terminator TLV.

If the previous two operations are successful the new application-specific data is identified after the Terminator TLV. The reader device compatible with the new-application can read this data after the Terminator TLV.

The memory area of the magic number can contain 2-4 bytes length field that indicates the length of the new application-specific data payload.

As mentioned above, the indication of the data after the Terminator TLV may be also given by inserting a new record in the NDEF message that contains the indication of data after the Terminator TLV and its length.

It is also possible to provide more than one length in case the data after the Terminator TLV is composed of more than one field.

In case the location of the data is not directly after the Terminator TLV one or more byte addresses indicating the beginning of the field may be given inside a new record of the NDEF message.

Addresses and lengths of the data after the Terminator TLV may also be retrieved from default values that are application specific.

The invention can be used to be backward compatible with existing infrastructure like reader devices already deployed but at the same time to provide new additional features.

It should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

In order to recapitulate the above described embodiments of the present invention one can state:

The "Type 2 Tag Operational" draft specification shows how to store data inside a specific type of contactless cards or tags. This invention provides an additional way to application to store data inside the tag. It may be used for example to extend the memory area of new application versions, remaining backward compatible with the old ones. Moreover it provides a way to store inside the tag data that cannot be seen by an NFC Forum reader device. This functionality may be used to store any kind of data in any kind of format. For example this allows storing data without the overhead proposed by the "Type 2 Tag Operational" draft specification and NFC Data Exchange Format (NDEF).

The invention provides an additional method to store data inside any contactless card compliant to the "Type 2 Tag Operational". It is intended for any NFC Forum Device e.g. mobile phones, PDA, that stores data inside NFC Forum Type 2 Tags.

Possible advantages of this solution are inter alia:
exploitation of non-used memory area: the data is stored in non-used memory area of the Type 2 Tag,
capability to hide data in non-used memory areas being not visible using NFC Forum compliant reader devices,
the method can be used by NFC Forum application that need an additional memory area to store data without touching the one defined by the NFC Forum standardization e.g. due to backward compatibility reasons, and
The data stored in the non-used memory area can avoid to use the overhead required by "Type 2 Tag Operational" specification draft and NFC Data Exchange Format (NDEF).

In other words, memory areas which, according to the predetermined protocol, are not used can be used for new applications, data can be hidden in these areas such that they can not be read by protocol compliant reader devices and the data structure read or written by the method of the invention is compatible with the former predetermined protocol. Furthermore, the structure of additional data to be stored behind the terminator data block is not limited to any specific data structure such that any kind of data format can be used for such additional data.

The invention is applicable inter alia to:
- all contactless tag compliant to the "Type 2 Tag Operational" specification draft of the NFC Forum, and
- any data structure that follows that one specified by the "Type 2 Tag Operational" specification draft of the NFC Forum.

The invention claimed is:

1. A method for storing data in a memory array of a transponder, wherein a data structure for storing data within the memory array is defined by a predetermined protocol, the data structure comprising a header data block including pre-defined header data, an application data block for storing application data, and a terminator data block, the method comprising:
   storing additional application data within the memory array behind the terminator data block; and
   using the terminator data block to prevent reader devices using the predetermined protocol from accessing the stored additional application data, wherein a specialized reader is used to access the stored additional application data.

2. The method according to claim 1, further comprising:
   storing an indicator for indicating that application data are stored within the memory array behind the terminator data block wherein the indicator is stored in the terminator data block.

3. The method according to claim 1, further comprising:
   storing an indicator for indicating that application data are stored within the memory array behind the terminator data block, wherein the indicator is stored behind the terminator data block.

4. A method for reading data in a memory array of a transponder, wherein a data structure for storing data within the memory array is defined by a predetermined protocol, the data structure comprising a header data block including pre-defined header data, an application data block for storing application data, and a terminator data block, the method comprising:
   searching for an indicator, wherein the indicator includes data for indicating that additional application data are stored within the memory array behind the terminator data block; and
   reading, with a specialized reader, additional application data stored within the memory array behind the terminator data block, wherein reader devices using the predetermined protocol cannot access the additional application data.

5. The method according to claim 2, wherein the indicator comprises a storage address.

6. The method according to claim 1, wherein the predetermined protocol is the Type 2 Tag Operation specification of the Near Field Communication (NFC) Forum.

7. The transponder in which data are stored in accordance with claim 1.

8. A read/write device that performs the method according to claim 1.

9. A non-transitory medium including a program element that performs the method according to claim 1.

10. The method according to claim 1, further comprising:
    storing an indicator for indicating that application data are stored within the memory array behind the terminator data block wherein the indicator is stored in the header data block.

11. The method according to claim 1, further comprising:
    storing an indicator for indicating that application data are stored within the memory array behind the terminator data block wherein the indicator is stored in the application data block.

12. The method according to claim 4, wherein the predetermined protocol is the Type 2 Tag Operation specification of the Near Field Communication (NFC) Forum.

13. The method according to claim 2, wherein the indicator comprises a data field length.

14. The method according to claim 2, wherein the indicator comprises a number of data fields.

15. The method according to claim 2, wherein the indicator comprises a type of application data stored behind the terminator data block.

16. The method according to claim 1, wherein the transponder is a Radio Frequency IDentification (RFID) tag.

17. The method according to claim 1, wherein the transponder is a contactless smart card.

18. The method according to claim 2, wherein the indicator provides an absolute position for the stored additional application data.

19. The method according to claim 2, wherein the indicator provides a position for the stored additional application data relative to a position of the terminator data block.

20. The method according to claim 1, wherein the transponder is an active device that emulates a Radio Frequency IDentification (RFID) tag.

* * * * *